US010307686B2

(12) United States Patent
Bearsch et al.

(10) Patent No.: US 10,307,686 B2
(45) Date of Patent: Jun. 4, 2019

(54) ACTIVITY GYM

(71) Applicant: Skip Hop, Inc., New York, NY (US)

(72) Inventors: Benjamin Bearsch, Brooklyn, NY (US); Peter Therrien, Brooklyn, NY (US); Chelsea Carter, Jersey City, NJ (US); Janet Villano, Jersey City, NJ (US); Ellen Diamant, New York, NY (US)

(73) Assignee: SKIP HOP, INC., New York, NY (US)

( * ) Notice: Subject to any disclaimer, the term of this patent is extended or adjusted under 35 U.S.C. 154(b) by 0 days.

(21) Appl. No.: 15/354,771

(22) Filed: Nov. 17, 2016

(65) Prior Publication Data

US 2018/0133613 A1    May 17, 2018

(51) Int. Cl.
| | | |
|---|---|---|
| *A63H 33/00* | (2006.01) | |
| *G03B 17/56* | (2006.01) | |
| *G03B 29/00* | (2006.01) | |
| *F16M 13/00* | (2006.01) | |

(52) U.S. Cl.
CPC ......... *A63H 33/006* (2013.01); *G03B 17/561* (2013.01); *G03B 29/00* (2013.01)

(58) Field of Classification Search
CPC .... A63H 33/00; A63H 33/003; A63H 33/006; A63H 33/007; A63H 5/00; F16M 13/00; F16M 13/04; E04B 1/00; E04B 1/34
USPC .... 446/71–76, 227; 206/216, 576, 578, 307, 206/307.1, 316.1, 316.2; 5/655; 135/132, 133, 137; 52/2, 3, 66
See application file for complete search history.

(56) References Cited

U.S. PATENT DOCUMENTS

| | | | |
|---|---|---|---|
| 4,833,837 A * | 5/1989 | Bonneau | E04H 15/20 52/2.19 |
| 4,858,634 A | 8/1989 | McLeese | |
| 5,059,463 A | 10/1991 | Peters | |
| 5,337,772 A | 8/1994 | Habchi | |
| D359,869 S | 7/1995 | Oren | |
| 5,928,054 A | 7/1999 | Mast | |
| 5,930,854 A | 8/1999 | O'Neill et al. | |
| 6,109,282 A | 8/2000 | Yoon | |
| 6,199,229 B1 | 3/2001 | Wong | |
| 6,264,521 B1 * | 7/2001 | Hernandez | H04N 7/185 348/151 |
| 6,571,410 B2 | 6/2003 | Zheng | |
| 6,702,643 B1 | 3/2004 | Drosendahl et al. | |
| 7,018,267 B2 | 3/2006 | Delaney et al. | |

(Continued)

FOREIGN PATENT DOCUMENTS

GB    2518140    3/2015

*Primary Examiner* — Kien Nguyen
(74) *Attorney, Agent, or Firm* — Stephen J. Weyer, Esq.; James R. Hayne, Esq.; Stites & Harbison, PLLC (57) ABSTRACT

An activity gym with an arch that is readily movable between a first position and a second position. The activity gym includes a base sized to support an infant positioned on the base with the base having a perimeter. The nursing cover further includes an arch pivotally connected to the base along the perimeter of the base. The arch movable between a first position in which the arch is substantially perpendicular to the base and a second position in which the arch is adjacent to the base. The activity gym can also include a means for affixing an image capturing device such that the image capturing device is capable of capturing images of an infant positioned on the base of the activity gym.

17 Claims, 6 Drawing Sheets

(56) References Cited

U.S. PATENT DOCUMENTS

| | | |
|---|---|---|
| 7,201,177 B2 | 4/2007 | Articoli et al. |
| 7,302,724 B2 | 12/2007 | Solomon et al. |
| 7,490,379 B2 | 2/2009 | Solomon et al. |
| 7,523,719 B2 | 4/2009 | Miller et al. |
| 7,575,011 B2 | 8/2009 | Zheng |
| 7,918,710 B2 | 4/2011 | Bapst et al. |
| D653,005 S | 1/2012 | Haaf |
| 8,430,711 B2 | 4/2013 | Chininis et al. |
| 8,460,053 B2 | 7/2013 | Fair et al. |
| 8,544,949 B2 | 10/2013 | Taton |
| 8,616,932 B2 | 12/2013 | Gelfond et al. |
| 8,667,626 B2 | 3/2014 | Zheng |
| 8,795,023 B2 | 8/2014 | Elson |
| 8,827,760 B2 * | 9/2014 | Ushibo .................. A63H 3/003 446/268 |
| 8,882,557 B2 | 11/2014 | Fair et al. |
| 8,920,208 B2 | 12/2014 | Elson |
| 9,011,196 B2 * | 4/2015 | Weisman ............. A63H 33/006 446/227 |
| 2004/0063381 A1 | 4/2004 | Norman |
| 2004/0242118 A1 * | 12/2004 | Schreiber-Setzemski ................... A47D 15/003 446/227 |
| 2005/0153630 A1 | 7/2005 | Delaney et al. |
| 2005/0172411 A1 | 8/2005 | Snedeker |
| 2006/0112486 A1 | 6/2006 | Delaney et al. |
| 2006/0253987 A1 | 11/2006 | Solomon et al. |
| 2007/0066446 A1 | 3/2007 | Gelfond et al. |
| 2007/0204405 A1 | 9/2007 | Solomon et al. |
| 2007/0243791 A1 * | 10/2007 | Stedman .................. A63H 5/00 446/227 |
| 2009/0017718 A1 | 1/2009 | Bryan et al. |
| 2009/0253342 A1 | 10/2009 | Oren et al. |
| 2011/0117808 A1 | 5/2011 | Fair et al. |
| 2011/0275273 A1 | 11/2011 | Oren et al. |
| 2012/0083183 A1 | 4/2012 | Zheng |
| 2013/0065479 A1 | 3/2013 | Elson |
| 2013/0280983 A1 | 10/2013 | Fair et al. |
| 2013/0280984 A1 | 10/2013 | Fair et al. |
| 2014/0194031 A1 | 7/2014 | Tobias et al. |
| 2014/0273719 A1 | 9/2014 | Weisman et al. |

* cited by examiner

ACTIVITY GYM

FIELD OF THE INVENTION

The present invention relates to an activity gym and in particular an activity gym with a rotatable arch which can be positioned perpendicular to a base or adjacent to the base.

BACKGROUND OF THE INVENTION

In the past the majority of infant activity gyms have been designed to accommodate small or newborn infants laying on his or her backs. Such designs include one or more arches spanning over a base mat with toys or objects that are attached to the arches. These toys and objects hang above the infant as it rests or plays on the base portion of the mat. One disadvantage of the previously known activity gyms is that when an infant is on his or her stomach, hanging toys are not readily seen or accessible. This may require purchasing an additional mat or toys for an infant to play with when on his or her stomach. Another disadvantage of some of previously known activity gyms is that the method of assembly and disassembly is often complicated and time consuming. Furthermore, some of the previously known activity gyms are difficult to clean. For the foregoing reasons, there is a need for an activity gym that is easy to assemble and disassemble, easy to wash, and provides opportunities for an infant to play regardless of the position of the infant on the mat.

SUMMARY OF THE INVENTION

The present invention is directed to an activity gym with an arch that is readily movable between a first position and a second position.

In one exemplary embodiment of the present invention, an activity gym includes a base sized to support an infant positioned on the base with the base having a perimeter. An arch is pivotally connected to the base along the perimeter of the base with the arch movable between a first position, in which the arch is substantially perpendicular to the base, and a second position, in which the arch is adjacent to the base.

The exemplary activity gym further includes a first actuating unit positioned along the perimeter of the base and a second actuating unit positioned along the perimeter of the base opposite the first actuating unit with each of the actuating units including a footing member that is configured to connect to the base and rest securely on the ground, and a pivoting member configured to connect to the arch and rotate relative to the respective footing member. When the pivoting members are in a vertical orientation relative to the respective footing member, the arch is in the first position, and when the pivoting members are in a horizontal orientation relative to the respective footing member, the arch is in the second position.

The base is comprised of a flexible panel, a first base support, and a second base support. The base supports are removably connected to the footing members of the actuating units to maintain the flexible panel in a substantially flat orientation.

The arch of the exemplary activity gym includes a first arch support, a second arch support, and one or more cross supports that extend between the first arch support and the second arch support. The first arch support includes two ends configured to connect to each one of the pivoting members of the actuating units, and similarly, the second arch support also includes two ends configured to connect to each of the pivoting members of the actuating units. Furthermore, a predetermined angle is defined between the first arch support and the second arch support, which in one exemplary activity gym is about 36°.

The first and second actuating units further include a locking mechanism configured to selectively lock the arch in the first position, the second position, or both the first position and the second position. That is to say, the pivoting members lock into position relative to the footing members in the vertical orientation and the horizontal orientation relative to the footing members. A pivot release button is located on the exterior of the footing members of the actuating units. In use, when the arch is locked in the first position, a user depresses both pivot release buttons to unlock the pivoting members from the footing members allowing the pivoting members to rotate relative to the footing members. The pivoting members, and thus the arch, are then rotated so that the arch moves away from the first position and towards the second position. Upon the arch reaching the second position, the pivoting members once again lock into position relative to the footing members, but now in the horizontal position. To move the arch back to the first position, a user once again depresses both pivot release buttons to unlock the pivoting members from the footing members and rotates the pivoting members, and thus the arch, upward.

With further respect to the arch, in the exemplary activity gym each of the one or more cross supports is a substantially rigid member with a first end that is connected to the first arch and a second end that is connected to the second arch and in some preferred embodiments the arch support includes a plurality of attachment mechanism (straps) which are used to removably connect cross supports to the first arch support and the second arch support.

Each of the one or more cross supports further includes one or more enrichment device which an infant can play with when the arch is in the first position, the second position, or both the first position and the second position. In particular, it is contemplated that at least some enrichment devices hang down from the cross supports when the arch is in the first position so that an infant can reach up to engage with the enrichment devices, and at least some other enrichment devices are only accessible when the arch is in the second position and adjacent to the base of the activity gym.

In one exemplary activity gym, at least one of the one or more cross supports, further includes means for affixing an image capturing device such that the image capturing device is capable of capturing images of an infant positioned on the base of the activity gym. In particular, a central member of the cross support includes a first surface, a second surface opposite the first surface, and a hole extends through the central member from the first surface to the second surface. The central member further includes a pocket positioned on the second surface of the central member at a position over the hole with the pocket sized to house a cell phone including a camera lens and a touch screen. In use, the cell phone is slide into an open end of the pocket such that the camera lens of the cell phone is aligned with the hole defined through the central member and the touch screen of the cell phone is accessible by way of a window defined by the pocket. In some embodiments a transparent sheet extends across the window to protect the cell phone or other similar device positioned within the pocket. Of course, other image capturing devices are contemplated including, but not limited to, tablets, cameras, baby monitors, and other portable electronic devices. Similarly, other means for affixing an image capturing device are contemplated depending on the particular type of image capturing device intended for use with the activity gym of the present invention. For example, adjustable straps including elastic, snaps, hook-and-loop fasteners, or the like could be used to secure the image capturing device to the central member.

In some embodiments, the central member is rotatable relative to the second cross support. As such, when the cell phone is positioned within the pocket, the central member can be rotated so that the camera lens is positioned to capture images of an infant positioned on the base of the activity gym or, conversely, the central member can be rotate so that the screen of the cell phone faces the infant. In this way, the cell phone itself can act as another enrichment device.

BRIEF DESCRIPTION OF THE DRAWINGS

The present invention will now be described with regard to the figures as identified below.

DETAILED DESCRIPTION

The present invention is directed to an activity gym with an arch that is readily movable between a first position and a second position.

Figure 1:
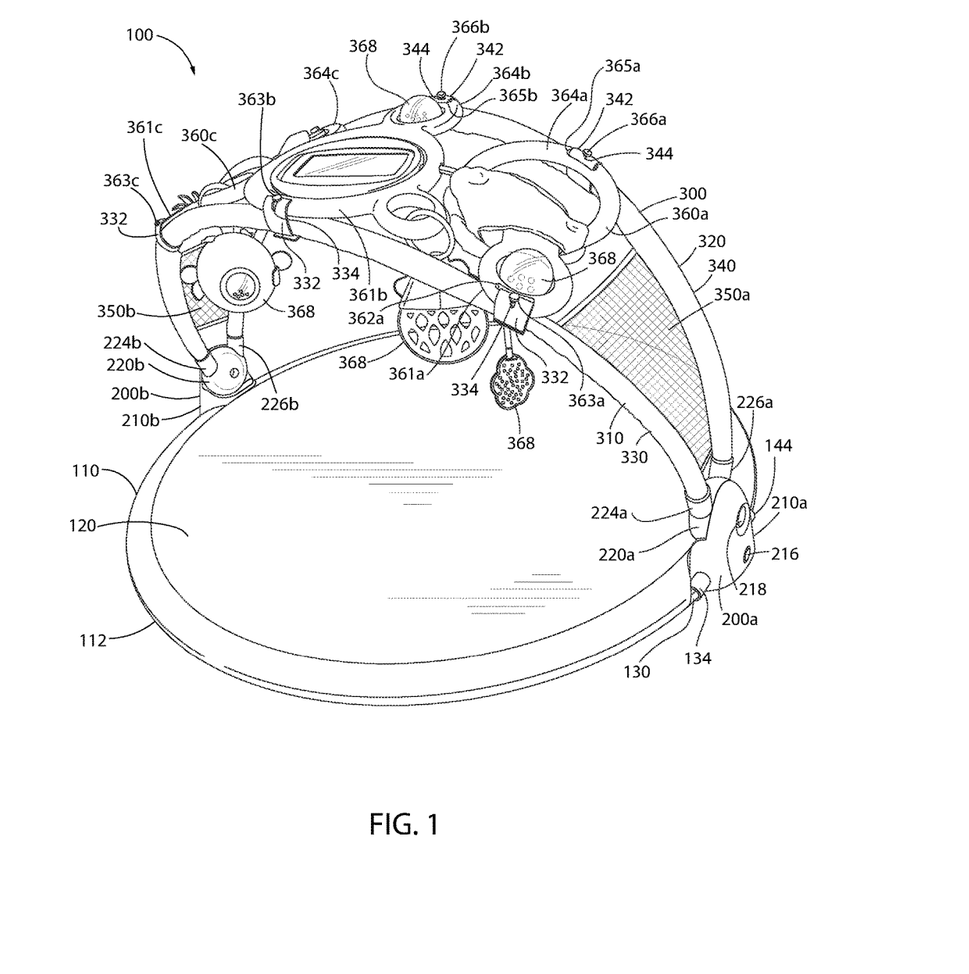
FIG. 1 is a perspective view of the an activity gym made in accordance with the present invention with an arch in a first position.
Figure 2:
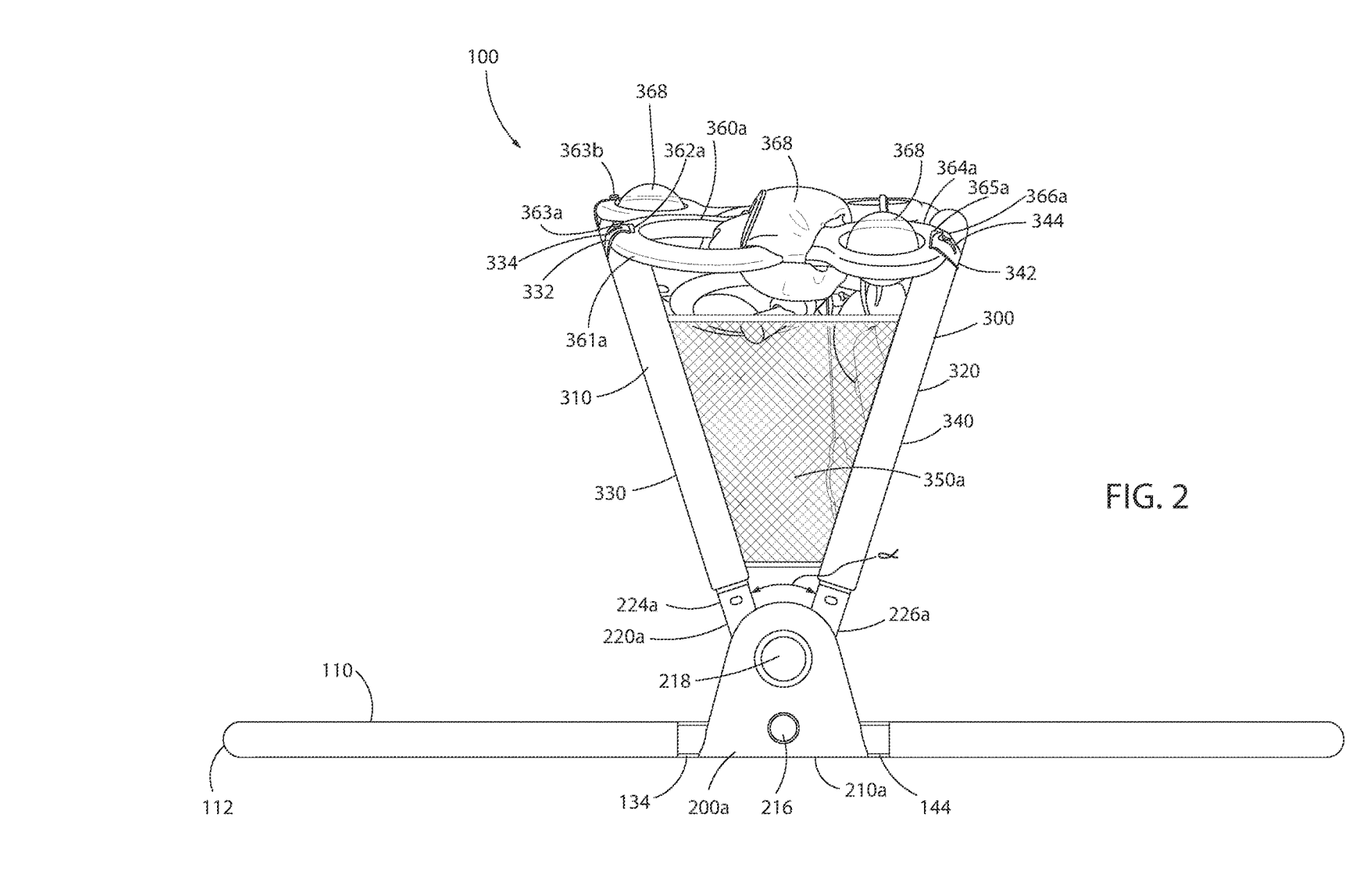
FIG. 2 is a side view of the activity gym of FIG. 1.
Figure 3:
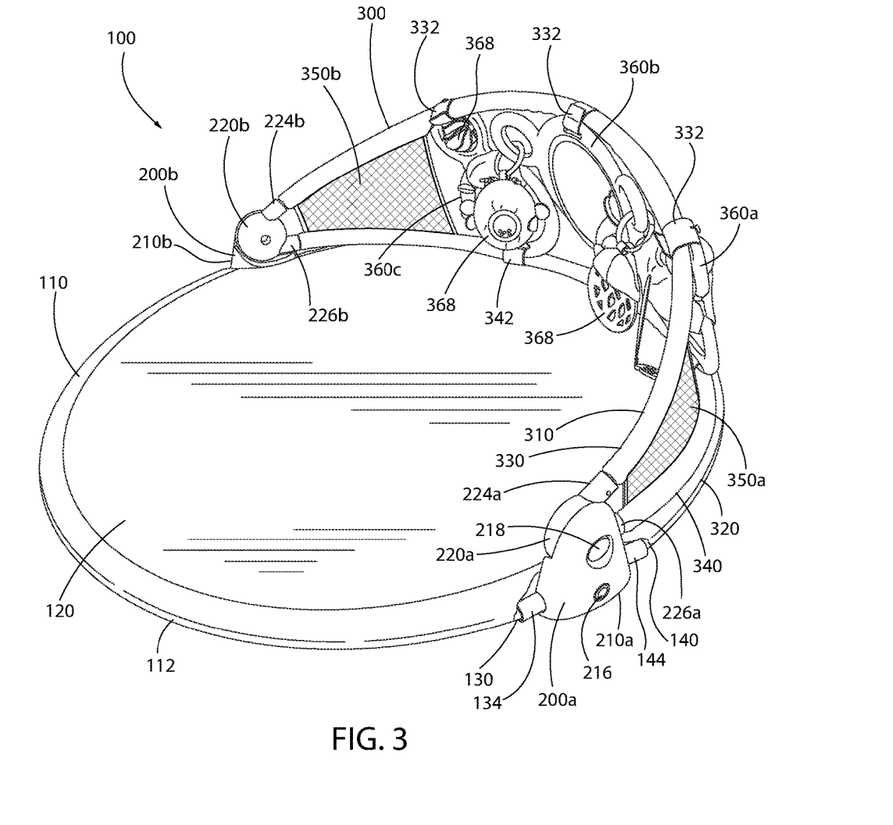
FIG. 3 is a perspective view of the activity gym of FIG. 1 but with the arch in a second position.

The present invention will now be described with regard to the Figures. Referring first specifically to FIGS. 1-4, an activity gym 100 made in accordance with one exemplary embodiment of the present includes a base 110 sized to support an infant positioned on the base 110 with the base 110 having a perimeter 112. An arch 300 is pivotally connected to the base 110 along the perimeter 112 of the base 110 with the arch 300 movable between a first position, as shown in FIGS. 1-2, in which the arch 300 is substantially perpendicular to the base 110, and a second position, as shown in FIG. 3, in which the arch 300 is adjacent to the base 110.

Figure 4:
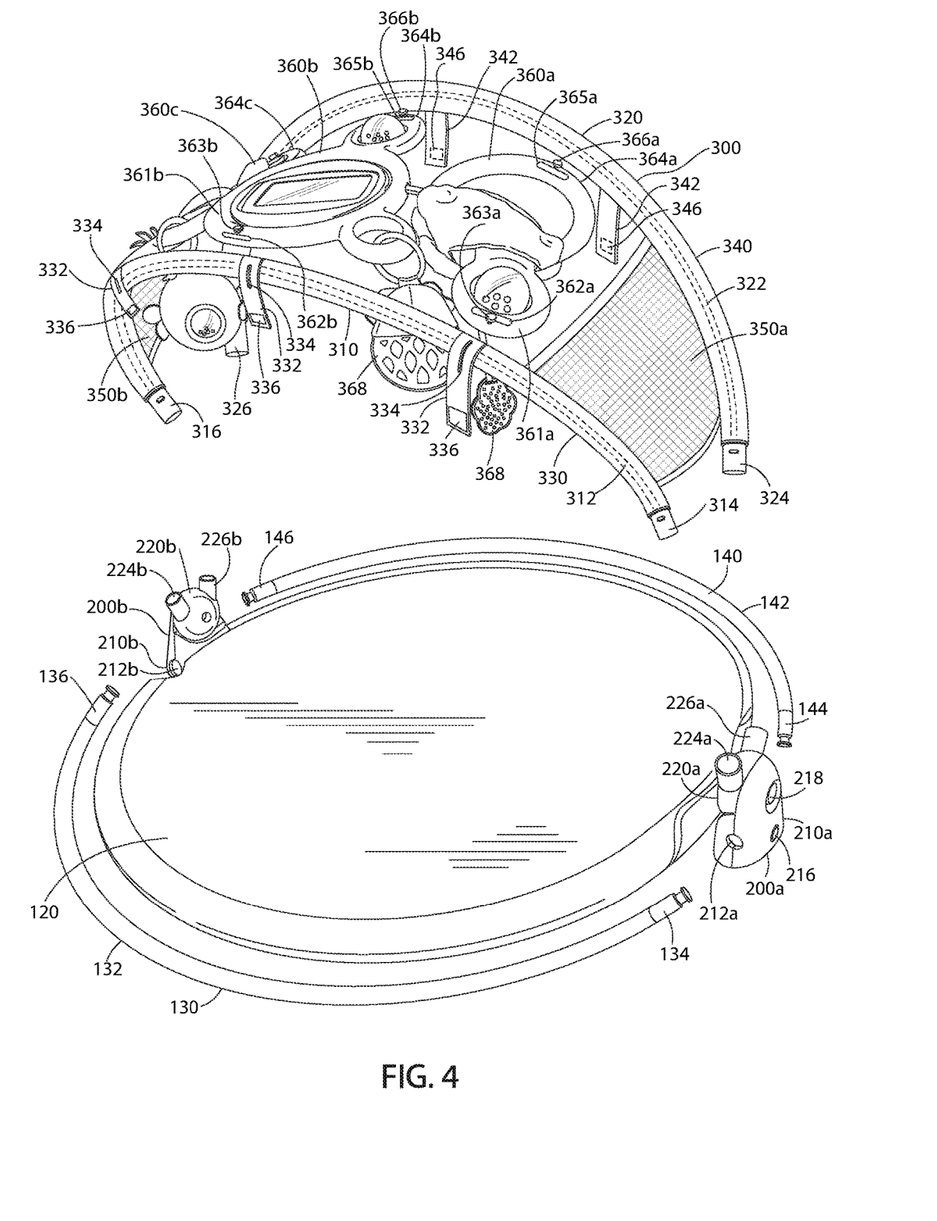
FIG. 4 is a partially exploded view of the activity gym of FIG. 1.

In particular, and referring now specifically to FIGS. 1, 3 and 4, the activity gym 100 includes a first actuating unit 200a positioned along the perimeter 112 of the base 110 and a second actuating unit 200b positioned along the perimeter 112 of the base 110 opposite the first actuating unit 200a which allow the arch 300 to rotate between the first position and the second position. Specifically, each of the actuating units 200a, 200b includes a footing member 210a, 210b that is configured to connect to the base 110 and rest securely on the ground, and a pivoting member 220a, 220b configured to connect to the arch 300 and rotate relative to the respective footing member 210a, 210b. In this way, and as discussed further below, when the pivoting members 220a, 220b are in a vertical orientation relative to the respective footing member 210a, 210b, the arch 300 is in the first position, and when the pivoting members 220a, 220b are in a horizontal orientation relative to the respective footing member 210a, 210b, the arch 300 is in the second position.

With respect to the base 110 itself, and referring now specifically to FIG. 4, in the exemplary activity gym 100, the base 110 is comprised of a flexible panel 120, a first base support 130, and a second base support 140. The first base support 130 and the second base support 140 are connected to the perimeter of the flexible panel 120 such that the first and second base supports 130, 140 collectively define the perimeter 112 of the base 110. With respect to the base supports 130, 140, the first base support 130 is made of a curved semi-flexible member 132 that includes two ends 134, 136 configured to removably connect to one of the actuating units 200a, 200b, and similarly, the second base support 140 is also made of a curved semi-flexible member 142 that includes two ends 144, 146 configured to removably connect to the actuating units 200a, 200b, as further discussed below. When the base supports 130, 140 are connected to the actuating units 200a, 200b, the semi-flexible members 132, 142 maintain the flexible panel 120 in a substantially flat orientation, and, in the embodiment shown in FIGS. 1-4, in a substantially circular shape. Although not expressly shown, when the base supports 130, 140 are disconnected from the actuating units 200a, 200b, the flexible panel 120 along with the base supports 120, 130 still in place can fold in half for easier storage and transportation of the activity gym 100. Furthermore, in at least some embodiments of the present invention, and as shown in FIG. 4, the base supports 130, 140 are also removable from the flexible panel 120 so that, for example, the flexible panel 120 can be washed separately from the remainder of the activity gym 100.

With respect to the connection between the first and second base supports 130, 140 and the actuating units 200a, 200b, a first end 134 of the first base support 130 is removably connected to the footing member 210a of the first actuating unit 200a, a second end 136 of the first base support 130 is removably connected to the footing member 210b of the second actuating unit 200b, a first end 144 of the second base support 140 is removably connected to the footing member 210a of the first actuating unit 200a, and a second end 146 of the second base support 140 is removably connected to the footing member 210b of the second actuating unit 200b. As shown in FIG. 4, the first end 134 of the first base support 130 is inserted into a hole 212a defined in the side of the footing member 210a of the first actuating unit 200a, and the second end 136 of the first base support 130 is inserted into a hole 212b defined in the side of the footing member 210b of the second actuating unit 200b. Each of the ends 134, 316 of the first base support 130 is configured to engage a catch, or similar means of connection, located within the footing members 210a, 210b of the actuating units 200a, 200b. Although not expressly shown, the ends 144 146 of the second base support 140 are similarly inserted into holes defined in the sides of the footing members 210a, 210b of the actuating units 200a, 200b opposite the holes 212a, 212b shown in FIG. 4.

Furthermore, although the means of connecting the ends 134, 136, 144, 146 of the first and second base supports 130, 140 within the footing members 210a, 210b of the actuating units 200a, 200b should be readily understood by one skilled in the art. Regardless of the particular means of connection, in the exemplary activity gym 100, the base supports 130, 140 are removably connected to each of the actuating units 200a, 200b. To this end, and as shown in FIGS. 1-4, a base release button 216 is located on the exterior of the footing member 210a of the first actuating unit 200a. When the first end 134 of the first base support 130 and/or the first end 144 of the second base support 140 is connected to the footing member 210a of the first actuating unit 200a, a user can release the first ends 134, 144 of the base supports 130, 140 from the first actuating unit 200a by depressing the base release button 216 and pulling each of the first end 134, 144 out of the footing member 210a of the actuating unit 200a. Although not show, it is contemplated that the footing member 210b of the second actuating unit 200b similarly includes a base release button substantially identical to the base release button 216 shown in FIGS. 1-4.

With respect to the arch 300, and referring once again to FIG. 4 in particular, the arch 300 includes a first arch support 310, a second arch support 320, and one or more cross supports 360a-360c that extend between the first arch support 310 and the second arch support 320. The first arch support 310 is made of a curved semi-flexible member 312 that includes two ends 314, 316 configured to connect to one of the actuating units 200a, 200b, and similarly, the second arch support 320 is also made of a curved semi-flexible member 322 that includes two ends 324, 326 configured to connect to the actuating units 200a, 200b. In particular, each of the actuating units 200a, 200b includes a first tubular extension 224a, 224b, and a second tubular extension 226a, 226b which protrude from the actuating units 200a, 200b. The first end 314 of the first arch support 310 is removably connected to the first tubular extension 224a on the pivoting member 220a of the first actuating unit 200a, the second end 316 of the first arch support 310 is removably connected to first tubular extension 224b on the pivoting member 220b of the second actuating unit 200b, the first end 324 of the second arch support 320 is removably connected to the second tubular extension 226a on the pivoting member 220a of the first actuating unit 200a, and the second end 326 of the second arch support 320 is removably connected to the second tubular extension 226b on the pivoting member 220b of the second actuating unit 200b. As shown in FIG. 4 each of the ends 314, 316, 324, 326 of the arch supports 310, 320 includes a tab which engages a catch on the respective tubular extension 224a, 224b, 226a, 226b so as to removably connect the arch supports 310, 320 to the actuating units 200a, 200b.

As perhaps best shown in FIG. 2, the first end 324 of the second arch support 320 is connected to the first pivoting member 220a adjacent to the first end 314 of the first arch support 310 but at an angle relative to the first end 314 of the first arch support 310. Similarly, the second end 326 of the second arch support 320 is connected to the second pivoting member 220b adjacent to the second end 316 of the first arch support 310 but at an angle relative to the second end 316 of the first arch support 310. As such, a predetermined angle, a, is defined between the first arch support 310 and the second arch support 320. In the exemplary activity gym 100 shown in FIGS. 1-4, the predetermined angle, α, is about 36°, however other angles are also contemplated. For example, in some embodiments, the predetermined angle, α, is between about 30° and about 40°. Of course, angles less than 30° or greater than 40° are also possible without departing from the spirit and scope of the present invention.

With further respect to the arch supports 310, 320, and referring now to FIGS. 1-4, the first arch support 310 further includes a padded exterior 330 that surrounds the semi-flexible member 312. The padded exterior 330 of the first arch support 310 can be made of any material known in art, but in the exemplary activity gym 100 shown in FIGS. 1-4, the padded exterior 330 is comprised of a foam tube with a fabric lining which surround the semi-flexible member 312 of the first arch support 310 and forms an exterior surface of the padded exterior 330. Along the length of the padded exterior 330 of the first arch support 310 are a plurality of attachment mechanism, which, in the exemplary activity gym 100 shown in FIGS. 1-4, are a plurality of straps 332. Each of the straps 332 defines a hole 334 and includes hook-and-loop fasteners 336, which are used to removably connect the one or more cross supports 360a-360c to the first arch support 310, as further discussed below. The second arch support 320 is formed substantially the same as the first arch support 310, and includes a padded exterior 340 comprised of a foam tube and fabric lining with a plurality of strap 342 defining holes 344 and including hook-and-look fasteners 346.

With respect to the one or more cross supports 360a-360c, and referring still to FIGS. 1-4, each of the one or more cross supports 360a-360c is a substantially rigid member with a first end 361a-c that is connected to the first arch 310 and a second end 364a-c that is connected to the second arch 320. In the exemplary activity gym 100 shown in FIGS. 1-4, the cross supports 360a-360c are formed primarily of interconnected circles, however any number of shapes are possible without departing from the spirit and scope of the present invention. Each of the first ends 361a-c of the cross supports 360a-360c defines a hole 362a-c and includes a post 363a-c with an enlarged distal end positioned adjacent to the hole 362a-c, and each of the second ends 364a-c of the cross supports 360a-360c similarly defines a hole 365a-c and includes a post 366a-c with an enlarged distal end positioned adjacent to the hole 365a-c.

To connect the one or more cross supports 360a-360c to the first and second arch supports 310, 320, and with reference to the first cross support 360a in particular, which is exemplary of each of the one or more cross supports 360a-360c, one of the plurality of straps 332 on the first arch support 310 is fed through the hole 362a at the first end 361a of the cross support 360a so that the hole 336 defined in the strap 332 is aligned with the post 363a at the first end 361a of the cross support 360a. The post 363a is pushed through the hole 336 of the strap 332, and the strap 332 is wrapped around the first end 361a of the cross support 360a until the hook-and-look fastener 336 of the strap 332 engages. Likewise, one of the plurality of straps 342 on the second cross support 320 is fed through the hole 365a at the second end 364a of the cross support 360a so that the hole 344 defined in the strap 342 is aligned with the post 366a at the second end 364a of the cross support 360a. The post 366a is pushed through the hole 344 of the strap 342, and the strap 342 is wrapped around the second end 364a of the cross support 360a until the hook-and-look fastener 346 of the strap 342 engages.

Referring still to FIGS. 1-4, each of the one or more cross supports 360a-360c further includes one or more enrichment device 368 which an infant can play with when the arch 300 is in the first position, the second position, or both the first position and the second position. In particular, it is contemplated that at least some enrichment devices 368 hang down from the cross supports 360a-360c when the arch 300 is in the first position so that an infant can reach up to engage with the enrichment devices 360, and at least some other enrichment devices 368 are only accessible when the arch 300 is in the second position and adjacent to the base 110 of the activity gym 100.

As previously mentioned, the first and second arch supports 310, 320 are connected to the pivoting member 220a, 220b of the actuating units 200a, 200b such that a predetermined angle, α, is defined between the first arch support 310 and the second arch support 320. The one or more cross supports 360a-360c help maintain the predetermined angle, α, between the first arch 310 and the second arch 320 when the one or more cross supports 360a-360c are connected to the first and second arch supports 310, 320. However, even when the one or more cross supports 360a-360c are not connected, it is contemplated that a mesh fabric 350a, 350b extending between the first arch support 310 and the second arch support 320 also prevents the first and second arch supports 310, 320 from separating beyond the predetermined angle, α. Furthermore, as shown in FIGS. 1-4, the mesh fabric 350a, 350b is positioned adjacent to each of the actuating units 200a, 200b, and in this way, it is contemplated that the mesh fabric 350a, 350b can prevent a body part of an infant, such as the infant's head or neck, from being positioned between the first arch support 310 and second arch support 320 thus avoiding possible injuries.

Referring still to FIGS. 1-4, as mentioned above, when the pivoting members 220a, 220b of the actuating units 200a, 200b, are in a vertical orientation relative to the respective footing member 210a, 210b, the arch 300 is in the first position, and when the pivoting members 220a, 220b of the actuating units 200a, 200b are in a horizontal orientation relative to the respective footing member 210a, 210b, the arch 300 is in the second position. To this end, the first and second actuating units 200a, 200b further include a locking mechanism configured to selectively lock the arch 300 in the first position, the second position, or both the first position and the second position. That is to say, the pivoting members 220a, 220b lock into position relative to the footing members 210a, 210b in the vertical orientation, the horizontal orientation, or both the vertical orientation and the horizontal orientation. In the exemplary activity gym 100 shown in FIGS. 1-4, the pivoting members 220a, 220b selectively locks into both the vertical orientation and the horizontal orientation relative to the footing members 210a, 210b. Although not expressly shown or described, the locking mechanism should be readily understood by one skilled in the art. Regardless of the particular locking mechanism utilized, in the exemplary activity gym 100, a pivot release button 218 is located on the exterior of the footing member 210a of the first actuating unit 200a. Although not show, it is contemplated that the footing member 210b of the second actuating unit 200b similarly includes a pivot release button substantially identical to the pivot release button 218 shown in FIGS. 1-4.

In use, when the arch 300 is locked in the first position, for example, as shown in FIGS. 1-2, a user depresses both pivot release buttons (only one pivot release button 218 shown) to unlock the pivoting members 220a, 220b from the footing members 210a, 210b allowing the pivoting members 220a, 220b to rotate relative to the footing members 210a, 210b. The pivoting members 220a, 220b, and thus the arch 300, are then rotated so that the arch 300 moves away from the first position shown in FIGS. 1-2 and towards the second position shown in FIG. 3. Upon the arch 300 reaching the second position, the pivoting members 220a, 220b once again lock into position relative to the footing members 210a, 210b, but now in the horizontal position. To move the arch 300 back to the first position, a user once again depresses both pivot release buttons 218 to unlock the pivoting members 220a, 220b from the footing members 210a, 210b and rotates the pivoting members 220a, 220b, and thus the arch 300, upward.

In the exemplary activity gym 100, the actuating units 200a, 200b, are configured to only allow rotation of the pivoting members 220a, 220b between the approximately 90° between the vertical position to the horizontal position. That is to say, and referring now to FIG. 2 in particular, when the arch 300 is in the first position, the arch 300 can only rotate clockwise in FIG. 2 until it reaches the second position. Conversely, when the arch 300 is in the second position, the arch 300 can only rotate counter-clockwise in FIG. 2 until it reaches the first position. Of course, in some embodiments, it is contemplated that another exemplary actuating unit can allow rotation of the arch in either direction from the first position such that the arch is capable of approximately 180° of rotation.

Figure 5A:
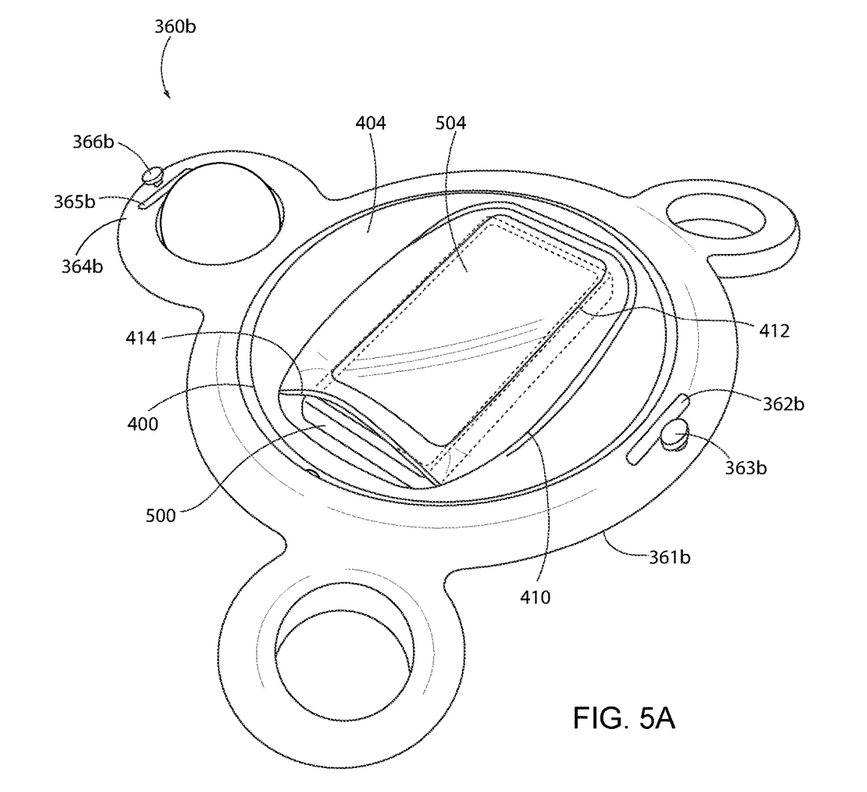
FIG. 5A is a detailed view of a cross member of the activity gym of FIG. 1 with an cell phone positioned in a pocket to capture an image of an infant positioned on the base of the activity gym.
Figure 5B:
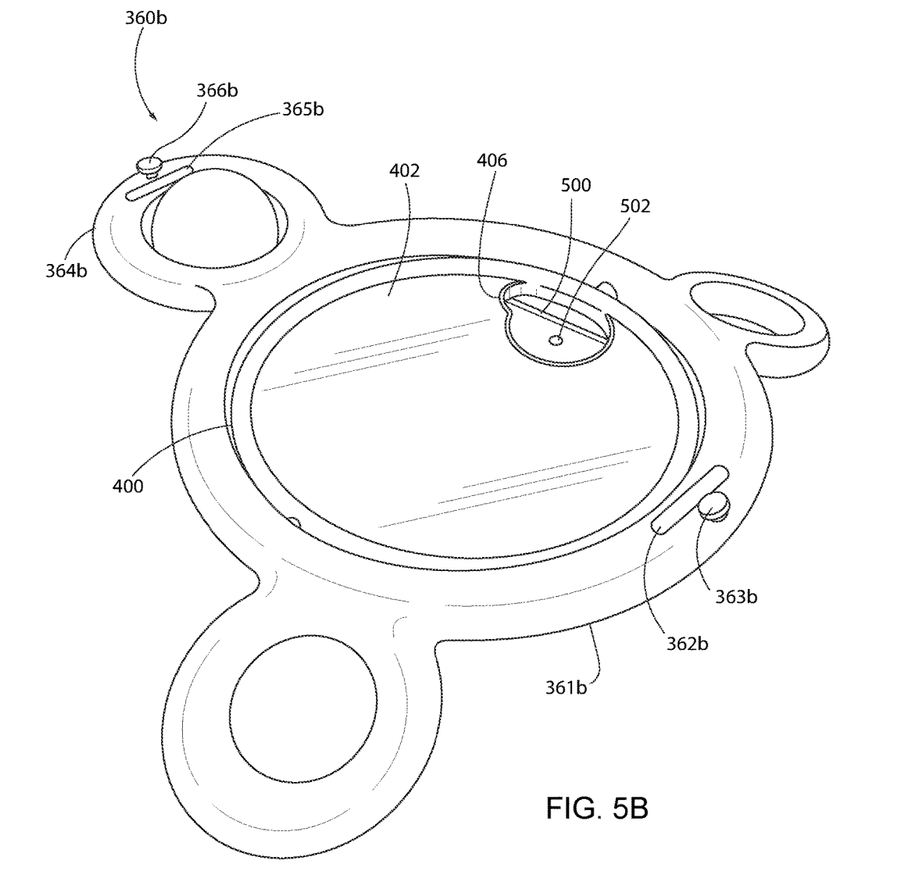
FIG. 5B is a detailed view of the cross member of FIG. 5A rotated so that the screen of the cell phone faces an infant positioned on the base of the activity gym.

Referring now to FIGS. 5A and 5B and the second cross support 360b in particular, in the exemplary activity gym 100, at least one of the one or more cross supports 360a-360c, e.g., the second cross support 360b, further includes means for affixing an image capturing device such that the image capturing device is capable of capturing images of an infant positioned on the base 110 of the activity gym 100. In particular, and as shown in FIGS. 5A and 5B, a central member 400 of the second cross support 360b includes a first surface 402, a second surface 404 opposite the first surface 402, and a hole 406 that extends through the central member 400 from the first surface 402 to the second surface 404. The central member 400 further includes a pocket 410 positioned on the second surface 404 of the central member 400 at a position over the hole 406 with the pocket 410 sized to house a cell phone 500 including a camera lens 502 and a touch screen 504. In use, the cell phone 500 is slide into an open end 414 of the pocket such that the camera lens 502 of the cell phone 500 is aligned with the hole 406 defined through the central member 400 and the touch screen 504 of the cell phone 500 is accessible by way of a window 412 defined by the pocket 410. In some embodiments a transparent sheet extends across the window to protect the cell phone 500 or other similar device positioned within the pocket 410. Of course, other image capturing devices are contemplated including, but not limited to, tablets, cameras, baby monitors, and other portable electronic devices. Similarly, other means for affixing an image capturing device are contemplated depending on the particular type of image capturing device intended for use with the activity gym of the present invention. For example, adjustable straps including elastic, snaps, hook-and-loop fasteners, or the like could be used to secure the image capturing device to the central member.

As shown in FIGS. 5A and 5B, in this exemplary embodiment, the central member 400 is rotatable relative to the second cross support 360b. As such, when the cell phone 500 is positioned within the pocket 410, the central member 400 can be rotated to the position shown in FIG. 5A so that the camera lens 502 is positioned to capture images of an infant positioned on the base 110 of the activity gym 100. Conversely, the central member 400 can be rotate to the position shown in FIG. 5B so that the screen 504 of the cell phone 500 faces the infant. In this way, the cell phone 500 itself can act as another enrichment device.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and can be made without departing from the spirit and scope of the presently-disclosed subject matter.

What is claimed is:

1. An activity gym, comprising:
a substantially planer stationary base sized to support an infant positioned on the base and having a perimeter; and
an arch pivotally connected to the base along the perimeter of the base, the arch movable between a first position in which the arch is in a plane substantially perpendicular to the base and a second position in which the plane of the arch is parallel to the planar base;
a first actuating unit positioned along the perimeter of the base and a second actuating unit positioned along the perimeter of the base opposite the first actuating unit, with each of the first and second actuating units including a footing member configured to connect to the base and a pivoting member configured to connect to the arch and rotate relative to the footing member;
a first arch support with a first end removably connected to the pivoting member of the first actuating unit and a second end removably connected to the pivoting member of the second actuating unit;
a second arch support with a first end removably connected to the pivoting member of the first actuating unit and a second end removably connected to the pivoting member of the second actuating unit; and
one or more cross supports extending between the first arch support and the second arch support; and
at least one enrichment device disposed on the arch and selected from the group consisting of toys, rings, balls, textured figures, spinner, rattle and a mirror.

2. The activity gym of claim 1, wherein the arch includes a means for affixing an image capturing device such that the image capturing device is capable of capturing images of an infant positioned on the base of the activity gym.

3. The activity gym of claim 1, wherein for each of the first and second actuating units, the pivoting member rotates between a vertical orientation relative to the respective footing member and corresponding to the first position of the arch and a horizontal orientation relative to the respective footing member and corresponding to the second position of the arch.

4. The activity gym of claim 1 wherein each of the first and second actuating units further includes a locking mechanism configured to selectively lock the arch in the first position, the second position, or both the first position and the second position.

5. The activity gym of claim 1, wherein the base includes a flexible panel having a perimeter;
a first base support connected to the perimeter of the flexible panel; and
a second base support connected to the perimeter of the flexible panel such that the first and second base supports collectively define the perimeter of the base.

6. An activity gym, comprising:
a substantially planer stationary base sized to support an infant positioned on the base and having a perimeter; and
an arch pivotally connected to the base along the perimeter of the base, the arch movable between a first position in which the arch is in a plane substantially perpendicular to the base and a second position in which the plane of the arch is parallel to the planar base;
a first arch support with a first end pivotally connected to the base and a second end pivotally connected to the base opposite the first end of the first arch support;
a second arch support with a first end pivotally connected to the base adjacent to the first end of the first arch support and a second end pivotally connected to the base opposite the first end of the second arch support and adjacent to the second end of the first arch support with a predetermined angle defined between the first arch support and the second arch support; and
at least one enrichment device disposed on the arch and selected from the group consisting of toys, rings, balls, textured figures, spinner, rattle and a mirror.

7. The activity gym of claim 6, wherein the predetermined angle is between about 30° and about 40°.

8. The activity gym of claim 6, wherein the predetermined angle is about 36°.

9. The activity gym of claim 6, wherein the arch further includes one or more cross supports extending between the first arch support and the second arch support.

10. The activity gym of claim 9, wherein at least one of the one or more cross supports includes a means for affixing an image capturing device such that the image capturing device is capable of capturing images of an infant positioned on the base of the activity gym.

11. The activity gym of claim 9, wherein at least one of the one or more cross supports includes a central member rotatable relative to the cross support, the central member configured to house an image capturing device such that the image capturing device is capable of capturing images of an infant positioned on the base of the activity gym.

12. The activity gym of claim 9, wherein each of the first and second arch supports includes a plurality of attachment mechanisms and each of the one or more cross supports is removably connected to one of the plurality of attachment mechanisms of the first arch and removably connected to one of the plurality of attachment mechanisms of the second arch.

13. The activity gym of claim 9, wherein at least one of the one or more cross supports includes an enrichment device.

14. The activity gym of claim 6, wherein the arch further includes a mesh fabric extending between the first arch support and the second arch support.

15. The activity gym of claim 6, wherein:
a first end of the first base support is removably connected to the first actuating unit;
a second end of the first base support is removably connected to the second actuating unit;
a first end of the second base support is removably connected to the first actuating unit; and
a second end of the second base support is removably connected to the second actuating unit.

16. An activity gym, comprising:
a substantially planar base including a flexible panel and having, a perimeter;
a first actuating unit positioned along the perimeter of the base, the first actuating unit including a footing member configured to connect to the base and a pivoting member configured to rotate relative to the footing member;
a second actuating unit positioned along the perimeter of the base opposite the first actuating unit, the second actuating unit including a footing member configured to connect to the base and a pivoting member configured to rotate relative to the footing member;
a first arch support with a first end pivotally connected to the pivoting member of the first actuating unit and a second end pivotally connected to the pivoting member of the second actuating unit;

a second arch support with a first end pivotally connected to the pivoting member of the first actuating unit and a second end pivotally connected to the pivoting member of the second actuating unit with a predetermined angle defined between the first arch support and the second arch support; and a cross support extending between the first arch support and the second arch support and including a means for affixing an image capturing device such that the image capturing device is capable of capturing images of an infant positioned on the base of the activity gym;

wherein for each of the first and second actuating units, each of the pivoting members rotate in the same direction relative to the respective actuating units between a vertical orientation in which the first arch support and the second arch support are in a plane substantially perpendicular to the flexible panel of the substantially planar base and a horizontal orientation in which the first arch support or the second arch support is in a plane substantially parallel to the flexible panel of the substantially planar base.

17. An activity gym, comprising:

a base sized to support an infant positioned on the base and having a perimeter;

an arch pivotally connected to the base along the perimeter of the base, the arch movable between a first position in which the arch is substantially perpendicular to the base and a second position in which the arch is adjacent to the base;

a first arch support with a first end pivotally connected to the base and a second end pivotally connected to the base opposite the first end of the first arch support;

a second arch support with a first end pivotally connected to the base adjacent to the first end of the first arch support and a second end pivotally connected to the base opposite the first end of the second arch support and adjacent to the second end of the first arch support with a predetermined angle defined between the first arch support and the second arch support; and a means for affixing an image capturing device to the arch such that the image capturing device is capable of capturing images of an infant positioned on the base of the activity gym.

\* \* \* \* \*